United States Patent
Zhu et al.

(10) Patent No.: US 11,316,549 B2
(45) Date of Patent: Apr. 26, 2022

(54) RADIO FREQUENCY TRANSMITTING AND RECEIVING DEVICES AND UNMANNED AERIAL VEHICLE SYSTEM

(71) Applicant: GOERTEK INC., Weifang (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Weifang (CN)

( * ) Notice: Subject to any disclaimer, the term of this patent is extended or adjusted under 35 U.S.C. 154(b) by 679 days.

(21) Appl. No.: 16/303,486

(22) PCT Filed: May 22, 2018

(86) PCT No.: PCT/CN2018/087910
§ 371 (c)(1),
(2) Date: Nov. 20, 2018

(87) PCT Pub. No.: WO2019/029222
PCT Pub. Date: Feb. 14, 2019

(65) Prior Publication Data
US 2021/0226656 A1 Jul. 22, 2021

(30) Foreign Application Priority Data
Aug. 8, 2017 (CN) .......................... 201710670394.5

(51) Int. Cl.
*H04B 1/16* (2006.01)
*H04B 1/40* (2015.01)
*H04B 7/185* (2006.01)

(52) U.S. Cl.
CPC ................. *H04B 1/16* (2013.01); *H04B 1/40* (2013.01); *H04B 7/18504* (2013.01)

(58) Field of Classification Search
CPC ........ H04B 1/44; H04B 1/0458; H04B 1/401; H04B 1/0483; H04B 1/48; H04B 1/04;
(Continued)

(56) References Cited

U.S. PATENT DOCUMENTS 6,771,214 B2   8/2004   Kober et al.
9,516,490 B1*  12/2016  Gerdes .................. G01S 13/765
(Continued)

FOREIGN PATENT DOCUMENTS

CN   101567705 A   10/2009
CN   106341358 A   1/2017
(Continued)

*Primary Examiner* — Vineeta S Panwalkar
(74) *Attorney, Agent, or Firm* — Saliwanchik, Lloyd & Eisenchenk (57) ABSTRACT

The present invention discloses radio frequency transmitting and receiving devices and an unmanned aerial vehicle system. The radio frequency transmitting device comprises: a first crystal oscillator, configured to provide a first clock signal with a frequency f; a reference signal receiving circuit, configured to receive a reference signal with a frequency (N−1)×f transmitted by a radio frequency receiving device; a frequency mixer, configured to perform frequency mixing processing on the first clock signal and the reference signal to obtain a carrier signal with a frequency N×f; a modulating circuit, configured to load a signal to be transmitted on the carrier signal, to obtain a frequency band signal; and a first transmitting circuit, configured to transmit the frequency band signal to the radio frequency receiving device. The radio frequency transmission performed according to the present invention has higher resistance to instantaneous vibration.

18 Claims, 7 Drawing Sheets

(58) Field of Classification Search
CPC ........ H04B 1/18; H04B 1/525; H04B 1/3822; H04B 7/01; H04B 7/0613; H04B 7/0617; H04B 17/11
See application file for complete search history.

(56) References Cited

U.S. PATENT DOCUMENTS

2008/0125060 A1* 5/2008 Lin ..................... H04B 1/0082
455/126
2015/0372710 A1* 12/2015 Longhurst ............... H04B 1/44
455/78

FOREIGN PATENT DOCUMENTS

CN 107359883 A 11/2017
WO 03023444 A1 3/2003

* cited by examiner

RADIO FREQUENCY TRANSMITTING AND RECEIVING DEVICES AND UNMANNED AERIAL VEHICLE SYSTEM

CROSS REFERENCE TO RELATED APPLICATIONS

This application is a National Stage of International Application No. PCT/CN2018/087910, filed on May 22, 2018, which claims priority to Chinese Patent Application No. 201710670394.5, filed on Aug. 8, 2017, both of which are hereby incorporated by reference in their entireties.

TECHNICAL FIELD

The present invention relates to the field of radio frequency transmission, and more particularly, to a radio frequency transmitting device, a radio frequency receiving device and an unmanned aerial vehicle system.

BACKGROUND

Figure 1:
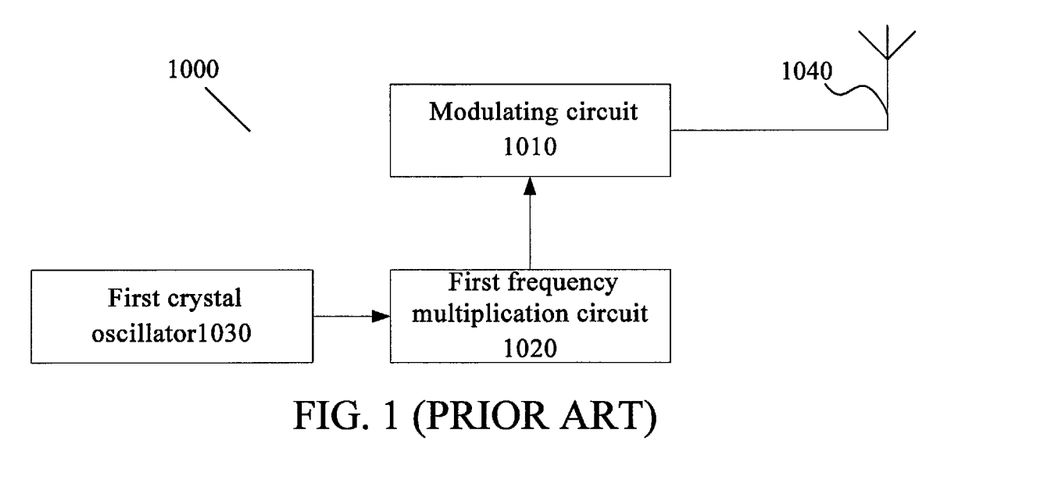
FIG. 1 is a principle block diagram of an existing radio frequency transmitting device.
Figure 2:
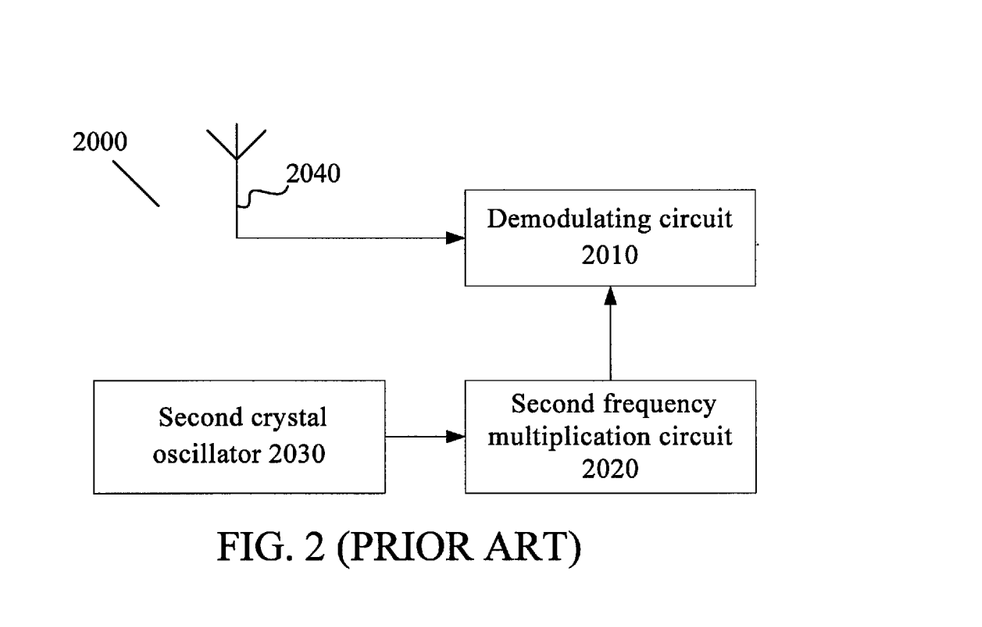
FIG. 2 is a principle block diagram of an existing radio frequency receiving device.

A radio frequency (RF) transmission system comprises a radio frequency transmitting device 1000 as shown in FIG. 1 and a radio frequency receiving device 2000 as shown in FIG. 2.

As shown in FIG. 1, the radio frequency transmitting device 1000 comprises a modulating circuit 1010, a first frequency multiplication circuit 1020, a first crystal oscillator 1030 and a first antenna 1040.

The first crystal oscillator 1030 outputs an intermediate frequency clock signal with a frequency f to the first frequency multiplication circuit 1020 for frequency increase, to obtain a carrier signal S0 with a frequency N×f, wherein N is a frequency multiplication rate of the first frequency multiplication circuit 1020, and N is a positive integer larger than 1.

The modulating circuit 1010 is configured to load a signal to be transmitted to the carrier signal S0 output by the first frequency multiplication circuit 1020, to obtain a frequency band signal S1. The frequency F of the frequency band signal S1 output by the modulating circuit 1010 is:

$$F=N\times f+B \qquad \text{Formula (1).}$$

In formula (1), B is the frequency offset caused by loading the signal to be transmitted to the carrier signal S0.

The radio frequency transmitting device 1000 sends the frequency band signal S1 loaded with the signal to be transmitted to the radio frequency receiving device 2000 in a ground station by the first antenna 1040.

The radio frequency receiving device 2000 comprises a demodulating circuit 2010, a second frequency multiplication circuit 2020, a second crystal oscillator 2030 and a second antenna 2040.

In order for the radio frequency receiving device 2000 to demodulate the signal to be transmitted from the received frequency band signal S1, corresponding to the first crystal oscillator 1030 and the first frequency multiplication circuit 1020 of the radio frequency transmitting device 1000, the second crystal oscillator 1030 is also configured to output the intermediate frequency clock signal with the frequency f to the second frequency multiplication circuit 2020 for frequency increase, to obtain a receiving clock signal with a frequency N×f.

The demodulating circuit 2010 filters the signal to be transmitted from the frequency band signal S1 received by the second antenna 2050 according to the receiving clock signal, and provides the filtered signal to a signal processing device for processing to obtain corresponding data for storing.

For the radio frequency transmitting device 1000 and the radio frequency receiving device 2000, under the condition that a carrying main body of the radio frequency transmitting device 1000 is susceptible to environmental impact to occur instantaneous vibration, for example, the carrying main body is an unmanned aerial vehicle, and the unmanned aerial vehicle is often subject to airflows and the like to cause the instantaneous vibration. When the crystal oscillation device is applied with external vibration, the frequency of a generated signal will be distorted. Therefore, the frequency of the intermediate frequency clock signal output by the first crystal oscillator 1030 under such a condition is changed to f+Δf from f, wherein f is a set fixed frequency value, and Δf is a frequency error generated by the instantaneous vibration. The error is a random variable. Its specific numerical value cannot be determined. The error will exist as long as the vibration exists, and cannot be eliminated by any algorithm or circuit.

Under such a condition, the frequency F' of a frequency band signal S1' output by the modulating circuit 1010 will be changed to: F'=N×(f+Δf)+B=N×f+N×Δf+B. In this way, the part of the signal to be transmitted filtered out by the demodulating circuit 2010 is about to be the part causing the frequency of the carrier signal S0 to be applied with the frequency offset N×Δf+B. The error Δf is applied with rate amplification at the radio frequency transmitting device 1000, and the amplifying rate is usually hundreds of times. Therefore, the error causes severe interference to the extraction of the data to be transmitted. As a result, the signal processing device cannot obtain the data to be transmitted.

If the ground station cannot obtain the data of the carrying main body of the radio frequency transmitting device 1000 under the condition of instantaneous vibration, then researchers cannot analyze the reasons for the instantaneous vibration according to these data and give an optimized solution to the instantaneous vibration. By taking the unmanned aerial vehicle as an example, the instantaneous vibration may cause instantaneous inclination, quick falling, and the like to the unmanned aerial vehicle. Therefore, the problem has become the problem to be solved emphatically for the unmanned aerial vehicle. However, under such a condition, the researchers cannot obtain the data of the unmanned aerial vehicle during the instantaneous vibration from the ground station. Consequently, the researchers are hindered from proposing the optimized solution to the problem of instantaneous vibration of the unmanned aerial vehicle by analyzing the data of the unmanned aerial vehicle at this moment.

SUMMARY

An objective of the embodiment of the present invention is to provide a technical solution of enabling a radio frequency receiving party to still obtain the data to be transmitted under the condition of the frequency error of a reference clock signal of a radio frequency transmitting party caused by instantaneous vibration or the like.

According to a first aspect of the present invention, there is provided a radio frequency transmitting device, comprising: a first crystal oscillator, configured to provide a first clock signal with a frequency f; a reference signal receiving circuit, configured to receive a reference signal with a frequency (N−1)×f transmitted by a radio frequency receiving device, wherein N is a positive integer larger than 1; a frequency mixer, configured to perform frequency mixing processing on the first clock signal and the reference signal to obtain a carrier signal with a frequency N×f; a modulating circuit, configured to load a signal to be transmitted on the carrier signal, to obtain a frequency band signal; and a first transmitting circuit, configured to transmit the frequency band signal to the radio frequency receiving device.

According to a second aspect of the present invention, there is provided a radio frequency receiving device, comprising a second receiving circuit, configured to receive a frequency band signal carrying a signal to be transmitted and transmitted by a radio frequency transmitting device; a clock signal generating circuit, configured to provide a receiving clock signal with a frequency N×f, wherein N is a positive integer larger than 1; a reference signal generating circuit, configured to provide a reference signal with a frequency (N−1)×f; a reference signal transmitting circuit, configured to transmit the reference signal to the radio frequency transmitting device for the radio frequency transmitting device to generate a carrier signal with a frequency N×f according to the reference signal, to modulate the signal to be transmitted to obtain the frequency band signal; and a demodulating circuit, configured to demodulate the frequency band signal according to the receiving clock signal, to obtain the signal to be transmitted.

According to a third aspect of the present invention, there is also provided an unmanned aerial vehicle system, comprising a ground monitoring station and an unmanned aerial vehicle. The unmanned aerial vehicle comprises the radio frequency transmitting device according the first aspect of the present invention. The unmanned aerial vehicle further comprises a signal providing device and at least one sensor. The at least one sensor transmits detected data to the signal providing device. The signal providing device generates a signal to be transmitted according to the data and to be output to a modulating circuit of the radio frequency transmitting device. The ground monitoring station comprises a signal processing device, and the radio frequency receiving device according to the second aspect of the present invention. The radio frequency receiving device outputs the signal to be transmitted obtained by a demodulating circuit to the signal processing device for processing and storing.

The present invention has one beneficial effect that according to the radio frequency transmitting device of the embodiment of the present invention, the frequency multiplication circuit is removed. The radio frequency transmitting device receives a high frequency reference signal provided by the radio frequency receiving device for frequency mixing with the first clock signal generated by the first crystal oscillator to obtain a high frequency carrier signal for loading the data to be transmitted rather than obtains the carrier signal by performing frequency multiplication processing on the first clock signal generated by the radio frequency transmitting device per se. In this way, the radio frequency receiving device can be disposed in a stable outside environment to cause the provided high frequency reference signal not to be affected by the outside environment. Therefore, when the radio frequency transmitting device has the instantaneous vibration, the frequency error generated by the first crystal oscillator will not be amplified. The radio frequency receiving device can obtain the data represented by the signal to be transmitted by demodulating. The data for example comprise the data such as images and videos captured by the carrying main body of the radio frequency transmitting device during instantaneous vibration, and for example, also comprise the movement data of the carrying main body during this period. It can be seen that using the radio frequency transmitting device and the radio frequency receiving device according to the present invention, the completeness of data transmission can be ensured in one aspect, and in the other aspect, it is also favorable for the researchers to propose the optimized solution to the problem of instantaneous vibration of the carrying main body of the radio frequency receiving device according to the data transmitted during the period.

BRIEF DESCRIPTION OF THE DRAWINGS

The drawings that are constitute a part of the description show the embodiments of the present invention and are intended to explain the principle of the invention together with the descriptions thereof.

DETAILED DESCRIPTION

Now, various embodiments of this invention will be described in detail with reference to the drawings. It should be noted that, unless specified otherwise, the relative arrangements of the members and steps, the mathematical formulas and numerical values described in these embodiments do not restrict the scope of the present invention.

The following descriptions for at least one embodiment are actually descriptive only, and shall not be intended to limit the present invention and any application or use thereof.

The techniques, methods and devices well known to those skilled in the related arts may not be discussed in detail. However, where applicable, such techniques, methods and devices should be deemed as a part of the description.

Any specific value shown herein and in all the examples should be interpreted as illustrative only rather than restrictive. Therefore, other examples of the embodiments may include different values.

It should be noted that similar signs and letters in the following drawings represent similar items. Therefore, once defined in one drawing, an item may not be further discussed in the followed drawings.

<Radio Frequency Transmitting Device>

Figure 3:
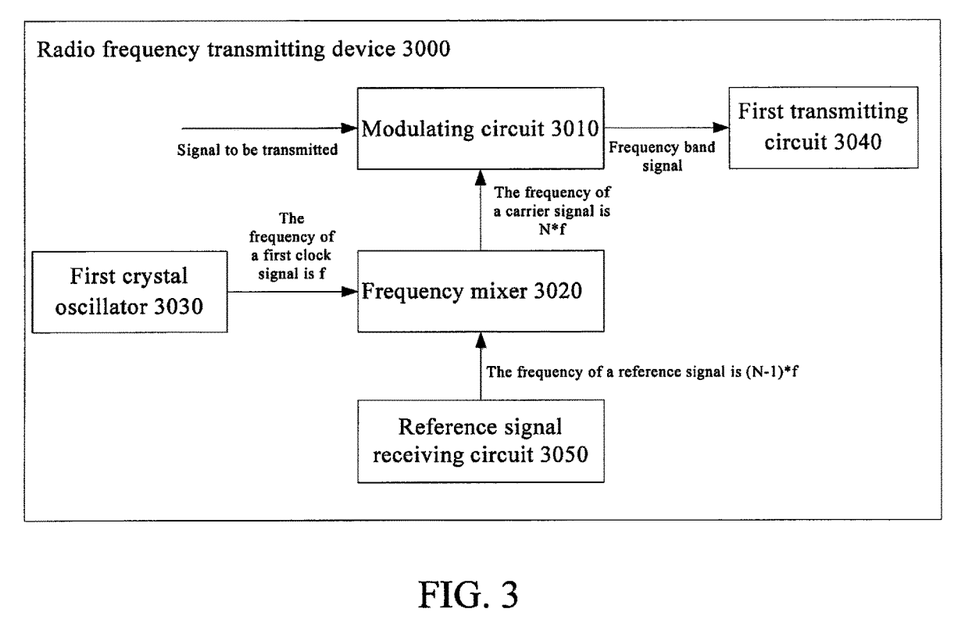
FIG. 3 is a principle block diagram of a radio frequency transmitting device according to an embodiment of the present invention.

FIG. 3 is a principle block diagram of a radio frequency transmitting device according to an embodiment of the present invention.

As shown in FIG. 3, the radio frequency transmitting device 3000 according to the embodiment of the present invention comprises a modulating circuit 3010, a frequency mixer 3020, a first crystal oscillator 3030, a first transmitting circuit 3040 and a reference signal receiving circuit 3050.

The first crystal oscillator 3030 is configured to provide a first clock signal with a frequency f.

The frequency f is a set fixed frequency value.

The crystal oscillator has a quartz plate therein. When voltage is applied to two ends of the quartz plate, the quartz plate will vibrate slightly, thereby generating a voltage signal having a stable frequency as a clock signal.

Figure 4:
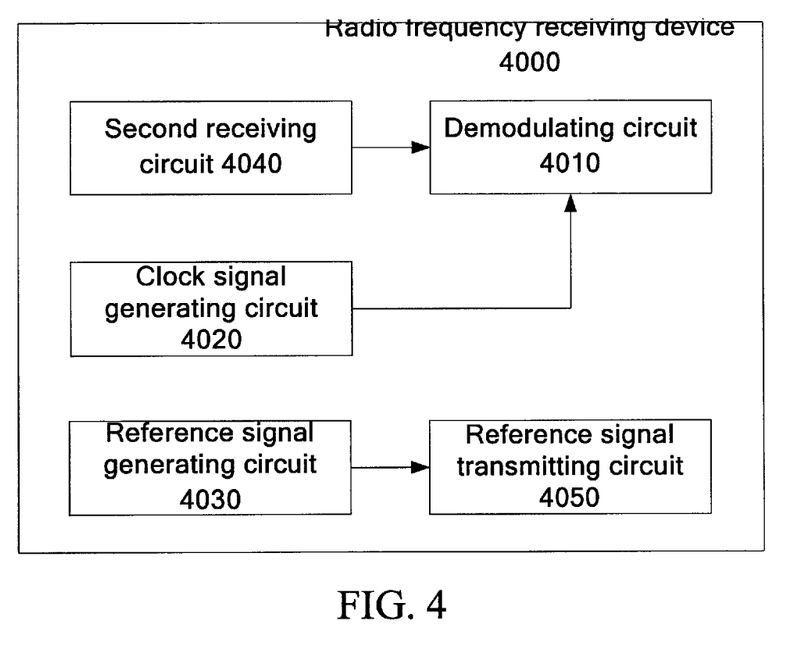
FIG. 4 is a principle block diagram of a radio frequency receiving device according to an embodiment of the present invention.

The reference signal receiving circuit 3050 is configured to receive a reference signal with a frequency (N−1)×f transmitted by, for example, a radio frequency receiving device 4000 as shown in FIG. 4, wherein N is a positive integer larger than 1.

The parameters such as an amplitude value and a phase of the reference signal may be same as the corresponding parameters of the first crystal oscillator 3030 or not.

The radio frequency receiving device 4000 may be disposed in a stable outside environment to at least cause the frequency parameter of the reference signal not to be interfered by the outside environment. It can be seen that the radio frequency receiving device 4000 may provide the reference signal with the precise frequency (N−1)×f. The precision merely depends on the circuit structure of a reference signal generating circuit of the radio frequency receiving device 4000 without the influence from the outside environment.

The stable outside environment for example is that the radio frequency receiving device 4000 is disposed on the fixed carrier of a ground monitoring station or the like.

The frequency mixer 3020 is configured to perform frequency mixing processing on the first clock signal and the reference signal to obtain a carrier signal with a frequency N×f.

The frequency mixer 3020 in the embodiment of the present invention is specifically an addition frequency mixer according to an action mode. That is, the frequency of the carrier signal output by the frequency mixer 3020 is equal to the sum of the frequencies of two input signals (the first clock signal and the reference signal).

The frequency mixer 3020 may be a triode frequency mixer, and may also be a diode frequency mixer.

The frequency mixer 3020 may be an active frequency mixer, and may also be a passive frequency mixer.

The modulating circuit 3010 is configured to load a signal to be transmitted on the carrier signal, to obtain a frequency band signal, which is also called as a modulated signal.

The signal to be transmitted is used for representing the data to be transmitted. The signal to be transmitted may be a digital signal and may also be an analog signal.

The modulating circuit 3010 may be a frequency modulating circuit. The modulating manner of the frequency modulating circuit is to change the frequency of the carrier signal by the signal to be transmitted, to obtain the frequency band signal.

The frequency F of the frequency band signal is:

$$F = N \times f + B \qquad \text{Formula (2).}$$

B is a frequency offset caused by loading the signal to be transmitted to the carrier signal.

The first transmitting signal 3040 is configured to transmit the frequency band signal obtained by the modulating circuit 3010 to, for example, the radio frequency receiving device 4000 as shown in FIG. 4.

According to the radio frequency transmitting device 3000 of the embodiment of the present invention, under the normal condition, the first transmitting circuit 3040 sends the frequency band signal with the frequency F to, for example, the radio frequency receiving device 4000 as shown in FIG. 4. The radio frequency receiving device 4000 demodulates the signal to be transmitted from the frequency band signal with the frequency F by a receiving clock signal with a frequency N×f according to the settings of the transmitting and receiving parties.

According to the radio frequency transmitting device 3000 of the embodiment of the present invention, when a carrying main body is applied with instantaneous vibration, the frequency of the first clock signal generated by the first crystal oscillator 3030 is changed from f to f+Δf. Δf is the frequency error generated by instantaneous vibration. The frequency of the carrier signal obtained by performing addition frequency mixing on the first clock signal and the reference signal through the frequency mixer 3020 is changed to N×f+Δf from N×f. The frequency of the frequency band signal is merely changed to F' from F:

$$F' = N \times f + \Delta f + B \qquad \text{Formula (3).}$$

At this point, the radio frequency receiving device 4000 still demodulates the frequency band signal with the frequency that has been changed to F' by the receiving clock signal with the frequency N×f according to the settings of the receiving and transmitting parties. Therefore, it is equivalent to filter out the demodulated signal causing the carrier signal with the frequency N×f to generate the frequency offset Δf+B Such a demodulated signal has the frequency error relative to the signal to be transmitted, but the frequency error of the demodulated signal is not amplified relative to the frequency error generated by the first crystal oscillator 3030 during the instantaneous vibration, and falls within a compensable range. Besides, relative to the prior art that the frequency error generated by the first crystal oscillator 1030 during the instantaneous vibration is amplified by N times, by the radio frequency receiving device 4000 according to the embodiment of the present invention, it is obvious that the frequency error of the demodulated signal relative to the signal to be transmitted can be controlled to the greatest extent. Further, the signal processing device can extract the data to be transmitted from the demodulated signal, thereby ensuring the completeness of data transmission in one aspect, and providing data support for the researchers to analyze the instantaneous vibration of the carrying main body in the other aspect.

Further, the above reference signal receiving circuit 3050 may receive the reference signal with a frequency (N−1)×f transmitted by, for the example, the radio frequency receiving device 4000 as shown in FIG. 4 by a first receiving antenna.

Here, except for the reference signal, the signals received by the first receiving antenna may also carry noise waves. Therefore, the reference signal receiving circuit 3050 may further comprise a filter circuit, to obtain the reference signal of (N−1)×f by the filter circuit.

According to the embodiment of the present invention, the reference signal receiving circuit 3050 receives the reference signal by the first receiving antenna, which can support the radio frequency transmission of a longer distance.

Further, the frequency of the first clock signal may be 19.2 MHz, and the frequency of the frequency band signal may be in the frequency band of 5.8 GHz. In this way, the above N times is as high as 300 times.

According to the radio frequency transmitting device 3000 of the embodiment of the present invention, the frequency of a transmission channel is higher, and higher anti-jamming capacity is realized.

By taking the unmanned aerial vehicle as an example in the following, the working manners of the radio frequency transmitting device according to the embodiment of the present invention and the existing radio frequency transmitting device under the same frequency band are explained, wherein the radio frequency transmitting device is disposed on the unmanned aerial vehicle, and the radio frequency receiving device is disposed in a ground monitoring station.

In the prior art, referring to FIGS. 1 and 2, when the unmanned aerial vehicle is applied with due to the action such as airflows, the frequency of the clock signal generated by the first crystal oscillator 1030 will be distorted. Therefore, under such condition, the first crystal oscillator 1030 outputs the clock signal with the frequency 19.2 MHz+Δf to the first frequency multiplication circuit 1020 for frequency multiplication processing. Δf is the frequency error generated by the instantaneous vibration. In this way, the first frequency multiplication circuit 1020 not only amplifies the clock signal of 19.2 MHz by 300 times, but also amplifies the frequency error Δf generated by the first crystal oscillator 1030 by 300 times. Further the frequency error amplified by 300 times is introduced into the carrier signal, and into the frequency band signal obtained by loading the signal to be transmitted to the carrier signal. The frequency error amplified by 300 times severely interferes the signal to be transmitted demodulated by the radio frequency receiving device 200 from the frequency band signal and generated by the unmanned aerial vehicle during the instantaneous vibration. As a result, the signal processing device cannot obtain the data to be transmitted, and further the data generated during the instantaneous vibration are caused to be lost.

While in the embodiment of the present invention, referring to FIGS. 3 and 4, when the monetary vibration occurs to the unmanned aerial vehicle, at the radio frequency transmitting device 3000, the frequency f of the first clock signal generated by the first crystal oscillator 3030 is also 19.2 MHz+Δf. Δf is the frequency error generated by the instantaneous vibration. The frequency mixer 3020 performs addition frequency mixing on the first clock signal with the frequency 19.2 MHz and the reference signal with the frequency 19.2 MHz×299 to obtain the carrier signal with the frequency 19.2 MHz×300+Δf. Thus it can be seen that the radio frequency transmitting device 3000 controls the frequency error of the frequency band signal obtained by the carrier signal and by loading the signal to be transmitted on the carrier signal to be the degree of the frequency error generated by the first crystal oscillator 3030, without further amplifying such frequency error. In this way, the radio frequency receiving device 4000 can demodulate the signal to be transmitted from the received frequency band signal by the receiving clock signal with the frequency 19.2 MHz× 300, and further obtains the data represented by the signal to be transmitted. Therefore, the data generated by the unmanned aerial vehicle during the instantaneous vibration can be stored.

In other embodiments, the frequency of the frequency band signal may also be in the frequency bands of 2.4 GHz and 1.2 GHz.

<Radio Frequency Receiving Device>

FIG. 4 is a principle block diagram of a radio frequency receiving device according to an embodiment of the present invention.

According to the FIG. 4, the radio frequency receiving device 4000 according to the embodiment of the present invention comprises a demodulating circuit 4010, a clock signal generating circuit, 4020, a reference signal generating circuit 4030, a second receiving circuit 4040 and a reference signal transmitting circuit 4050.

The second receiving circuit 4040 is configured to receive a frequency band signal carrying a signal to be transmitted and transmitted by, for example, the radio frequency transmitting device 3000 as shown in FIG. 3.

The clock signal generating circuit 4020 is configured to provide a receiving clock signal with a frequency N×f, wherein N is a positive integer larger than 1.

According to the settings of the transmitting and receiving parties, the frequency of the receiving clock signal is the same as the frequency of a carrier signal corresponding to the frequency band signal, such that the demodulating circuit 4010 can demodulate the signal to be transmitted from the frequency band signal according to the receiving clock signal.

The reference signal generating circuit 4030 is configured to provide a reference signal with a frequency (N−1)×f.

The reference signal transmitting circuit 4050 is configured to transmit the reference signal to the radio frequency transmitting device 3000 as shown in FIG. 3 for the radio frequency transmitting device 3000 to generate a carrier signal with a frequency N×f according to the reference signal, to modulate the signal to be transmitted to obtain the above frequency band signal.

The demodulating circuit 4010 is configured to demodulate the frequency band signal according to the receiving clock signal, to obtain the signal to be transmitted.

According to the radio frequency receiving device 4000 according to the embodiment of the present invention, under normal conditions, the second receiving circuit 4040 receives the frequency band signal with the frequency F. At this point, the radio frequency receiving device 4000 demodulates out the signal to be transmitted from the frequency band signal with the frequency F by the receiving clock signal with the frequency N×f according to the settings of the receiving and transmitting parties.

According to the radio frequency receiving device 4000 of the embodiment of the present invention, when the carrying main body of the radio frequency transmitting device 3000 as shown in FIG. 3 is subjected to the instantaneous vibration, the radio frequency receiving device 4000 provides the reference signal to the radio frequency transmitting device 3000 to be subjected to frequency mixing with the first clock signal to obtain the carrier signal. Therefore, the frequency error Δf generated by the first clock signal due to the instantaneous vibration will be directly and equivalently substituted into the carrier signal without being amplified. In this way, the frequency error of the frequency band signal received by the second receiving circuit 4040 is also controlled on the degree of the frequency error Δf generated by the first clock signal due to the instantaneous vibration. At this point, the radio frequency receiving device 4000 demodulates the frequency signal with the frequency F' by the receiving clock signal with the frequency N×f according to the settings of the receiving and transmitting parties. It is equivalent to filter the demodulated signal causing the carrier signal with the frequency N×f to generate the frequency offset Δf+B. Relative to the prior art that the frequency error generated by the first crystal oscillator 1030 during the instantaneous vibration is amplified by N times, it is obvious that the frequency error of the demodulated signal relative to the signal to be transmitted is controlled to the greatest extent. Further, the signal processing device can extract the data to be transmitted from the demodulated signal by an existing compensating means, thereby ensuring the completeness of data transmission in one aspect, and providing data support for the researchers to analyze the instantaneous vibration of the carrying main body in the other aspect.

Figure 5:
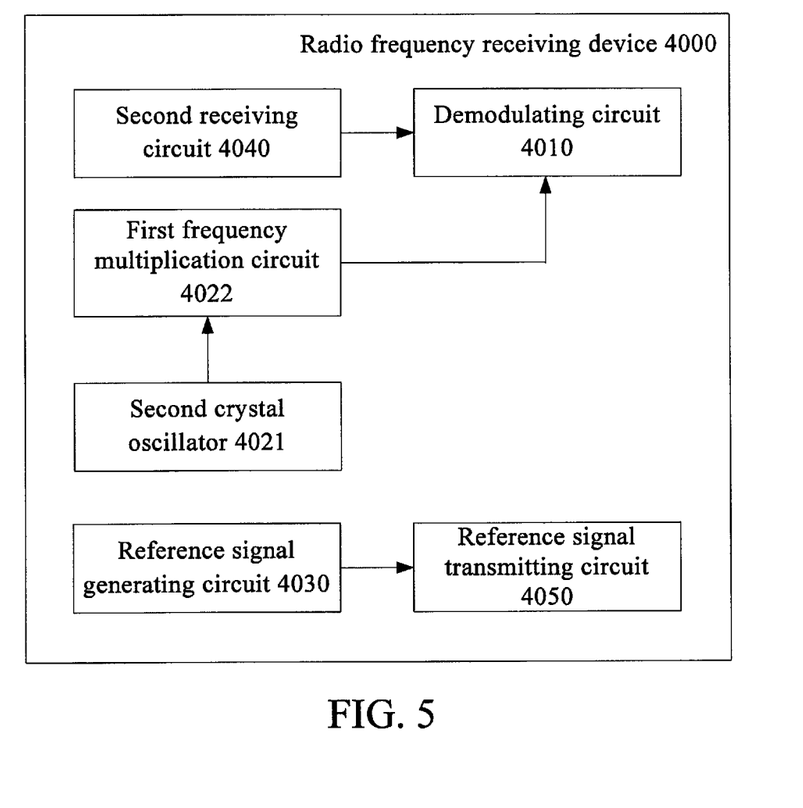
FIG. 5 is a principle block diagram of a clock signal generating circuit in FIG. 4.

Further, as shown in FIG. 5, the above clock signal generating circuit 4020 may further comprise a second crystal oscillator 4021 and a first frequency multiplication circuit 4022.

The second crystal oscillator 4021 is configured to provide a second clock signal with a frequency f.

The first frequency multiplication circuit 4022 is configured to perform N frequency multiplication processing on the second clock signal, to obtain the receiving clock signal with the frequency N×F, which is provided for the demodulating circuit 4010 to perform demodulation on the frequency band signal.

According to the embodiment of the present invention, the radio frequency receiving device 4000 can provide the receiving clock signal with the precise frequency by the clock signal generating circuit 4020.

Figure 6:
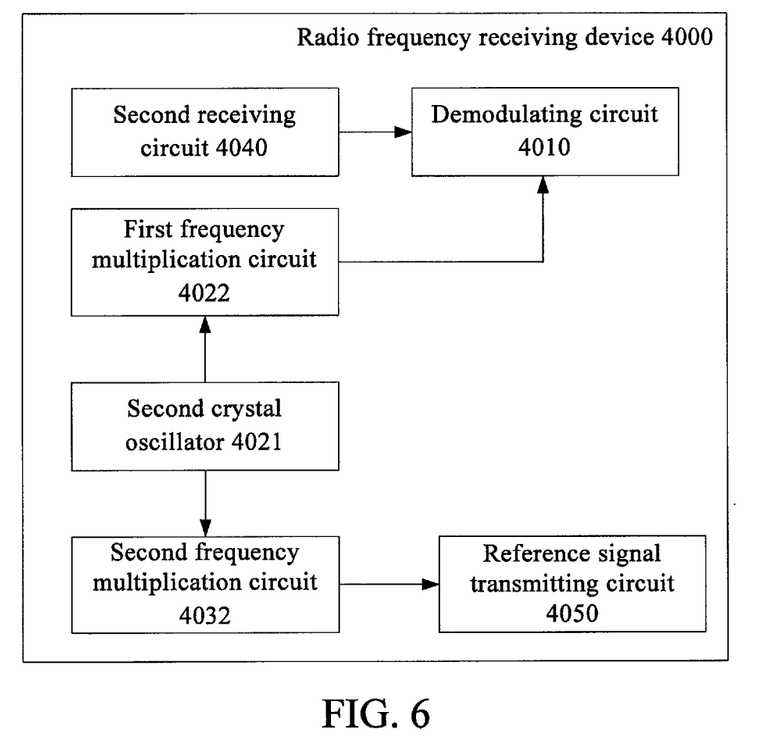
FIG. 6 is a principle block diagram of a reference signal generating circuit in FIG. 4.

Further, as shown in FIG. 6, the above reference signal generating circuit 4030 may comprise the above second crystal oscillator 4021 and a second frequency multiplication circuit 4032.

The second frequency multiplication circuit 4032 is configured to perform (N−1)×F frequency multiplication processing on the second clock signal, to obtain the reference signal with the frequency (N−1)×F.

According to the embodiment of the present invention, the reference signal generating circuit 4030 and the clock signal generating circuit 4020 share the crystal oscillator. The crystal oscillator can avoid the problem that the frequencies of the clock signals respectively generated by the two crystal oscillators are deviated to some extent due to technical errors compared with two independently disposed and same crystal oscillators. Further, the radio frequency receiving device 4000 is caused to provide the reference signal with the precise frequency by the reference signal generating circuit 4030.

Further, the above reference signal transmitting circuit 4050 may be configured to transmit the reference signal to, for example, the radio frequency transmitting device 3000 as shown in FIG. 3 by a second transmitting antenna.

According to the embodiment of the present invention, the reference signal transmitting circuit 4050 receives the reference signal by the second receiving antenna, which can support the radio frequency transmission of a longer distance.

Further, the above second receiving circuit 4040 may be configured to receive the frequency band signal transmitted by, for example, the radio frequency transmitting device 3000 as shown in FIG. 3 by the second receiving antenna.

According to the embodiment of the present invention, the second receiving circuit 4040 receives the frequency band signal by the second receiving antenna, which can support the radio frequency transmission of a longer distance.

<Radio Frequency Transceiving System>

The radio frequency transceiving system according to the embodiment of present invention comprises the radio frequency transmitting device 3000 according to any one embodiment of the present invention and the radio frequency receiving device 4000 according to any one embodiment of the present invention.

According to the settings of the radio frequency receiving and transmitting parties, the radio frequency transmitting device 3000 modulates the signal to be transmitted by setting the carrier signal with the frequency N×f to obtain the frequency band signal to transmit to the radio frequency receiving device 4000.

According to the settings of the radio frequency receiving and transmitting parties, the radio frequency receiving device 4000 demodulates the frequency band signal by setting the receiving clock signal with the frequency N×f to obtain the signal to be transmitted.

Figure 9:
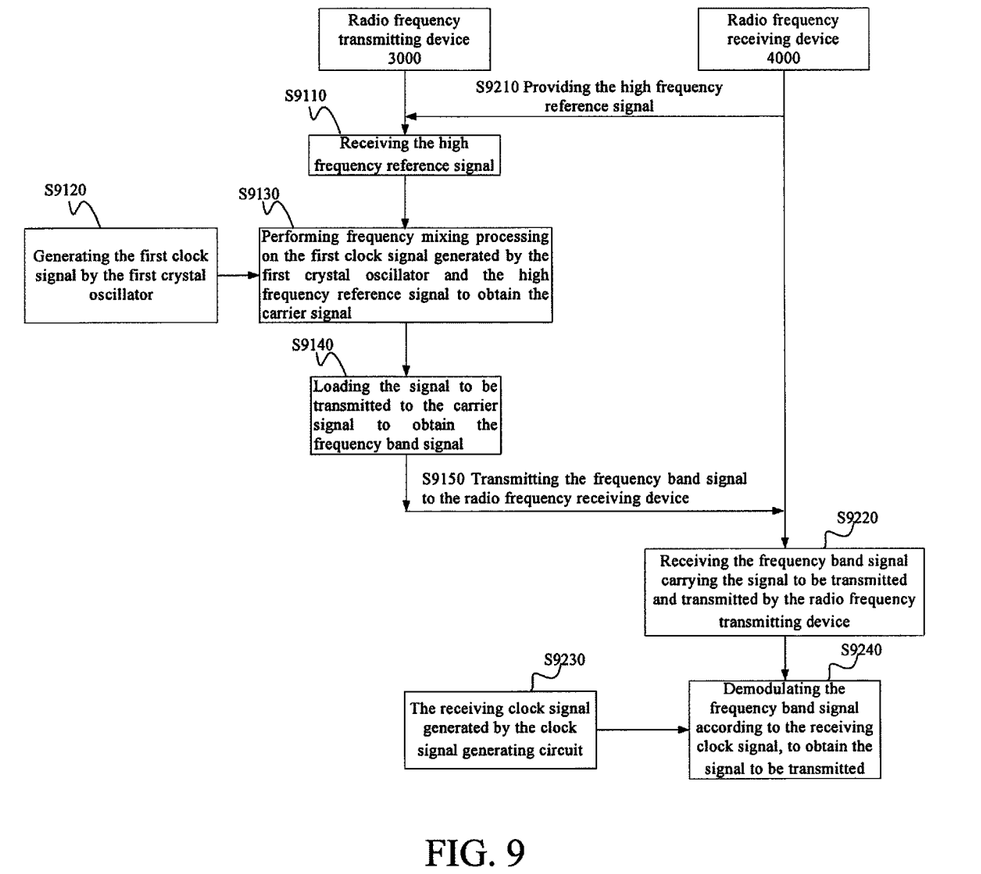
FIG. 9 is a schematic diagram of a working flow of a radio frequency transceiving system according to an embodiment of the present invention.

FIG. 9 is a schematic diagram of a work flow of the radio frequency transceiving system according to the embodiment of the present invention.

According to FIG. 9, the work flow of the radio frequency transceiving system according to the embodiment of the present invention may comprise the following steps.

Step S9210: the radio frequency receiving device 4000 generates the reference signal with the frequency (N−1)×f by the reference signal generating circuit 4030. The radio frequency receiving device 4000 sends the reference signal to the radio frequency transmitting device 3000 by the reference signal transmitting circuit 4050, wherein N is a positive integer larger than 1.

In step S9210, f, for example, is 19.2 MHz, and N for example is 300.

Step S9110: the radio frequency transmitting device 3000 receives the reference signal transmitted by the reference signal transmitting circuit 4050 by the reference signal receiving circuit 3050, and provides the same to the frequency mixer 3020 of the radio frequency transmitting device 3000.

Step S9120: the radio frequency transmitting device 3000 generates the first clock signal with the frequency f by the first crystal oscillator 3030, and provides the same to the frequency mixer 3020.

Step S9130: the radio frequency transmitting device 3000 performs frequency mixing on the first clock signal and the reference signal by a frequency mixer 3020 to obtain the carrier signal with the frequency N×f, and provides the same to the modulating circuit 3010.

Step S9140: the radio frequency transmitting device 3000 loads the signal to be transmitted to the carrier signal by the modulating circuit 3010, to obtain the frequency band signal, and provides the same to the first transmitting circuit 3040 of the radio frequency transmitting device 3000.

Step S9150: the radio frequency transmitting device 3000 sends the frequency band signal to the radio frequency receiving device 4000 by the first transmitting circuit 3040.

Step S9220: the radio frequency receiving device 4000 receives the above frequency band signal by the second receiving circuit 4040.

Step S9230: the radio frequency receiving device 4000 generates the receiving clock signal with the frequency N×f by the clock signal generating circuit 4020, and provides the same to the demodulating circuit 4010 of the radio frequency receiving device 4000.

Step S9240: the radio frequency receiving device 4000 demodulates the frequency band signal according to the receiving clock signal by the demodulating circuit 4010, to obtain the signal to be transmitted of the data to be transmitted.

According to the radio frequency transceiving system of the embodiment of the present invention, the radio frequency receiving device 4000 can demodulate to obtain the signal with a smaller frequency error relative to the signal to be transmitted when the carrying main body of the radio frequency transmitting device 3000 is applied with instantaneous vibration. The data to be transmitted are obtained according to the demodulated signal by the signal processing device without affecting radio frequency transmission. Therefore, the radio frequency transceiving system according to the embodiment of the present invention has higher instantaneous vibration resistance.

<Unmanned Aerial Vehicle>

Figure 7:
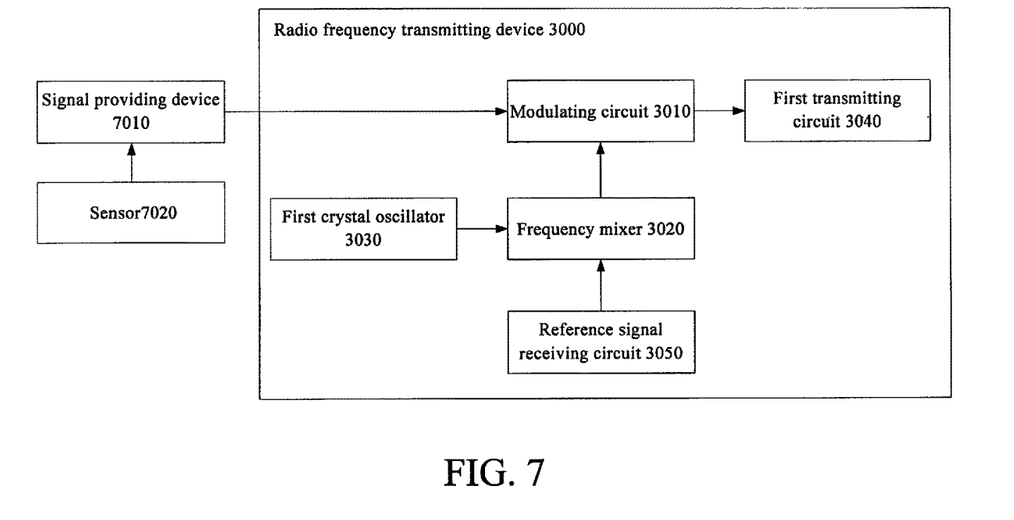
FIG. 7 is a principle block diagram of an unmanned aerial vehicle according to an embodiment of the present invention.

FIG. 7 is a principle block diagram of an unmanned aerial vehicle according to an embodiment of the present invention.

As shown in FIG. 7, the unmanned aerial vehicle according to the embodiment of the present invention comprises a signal providing device 7010, at least one sensor 7020 and the radio frequency transmitting device 3000 according to any one embodiment of the present invention.

The at least one sensor 7020 for example may comprise a camera device (image sensor), an accelerometer, an inertia measuring unit, a GPS, a tilt angle sensor, a current sensor, a magnetic sensor, etc.

The above camera device may be configured to capture images of an outside environment to obtain image and video data.

The above accelerometer may be configured to determine the position and flying attitude of the unmanned aerial vehicle.

The above inertia measuring unit may be configured to maintain the direction and the flying path of the unmanned aerial vehicle in combination with the GPS.

The above title angle sensor may provide data for keeping horizontal flying for a flying control device of the unmanned aerial vehicle.

The above current sensor may be configured to monitor and optimize electric energy consumption, thereby ensuring the safety of a battery and a motor fault detection system in the unmanned aerial vehicle.

The above magnetic sensor may be configured to provide critical inertia navigation and direction locating information.

The above at least one sensor 7020 outputs the detected data to the signal providing device 7010. The signal providing device 7010 generates the signal to be transmitted according to the detected data and to be output to the modulating circuit 3010 of the radio frequency transmitting device 3000.

According to the unmanned aerial vehicle of the embodiment of the present invention, various data generated during the instantaneous vibration can be accurately sent to the radio frequency receiving device 4000 by the above radio frequency transmitting device 3000. Further, the information processing device is caused to extract these data from the demodulated signal transmitted by the radio frequency receiving device 4000. These data may comprise the data such as images and videos of the unmanned aerial vehicle during the instantaneous vibration, and may also comprise the movement data of the unmanned aerial vehicle during the instantaneous vibration. Therefore, the completeness of data transmission is ensured in one aspect, and data support is provided for the researchers to analyze the problem of instantaneous vibration of the unmanned aerial vehicle in the other aspect, which is further favorable for proposing an optimized solution to the problem.

<Unmanned Aerial Vehicle System>

Figure 8:
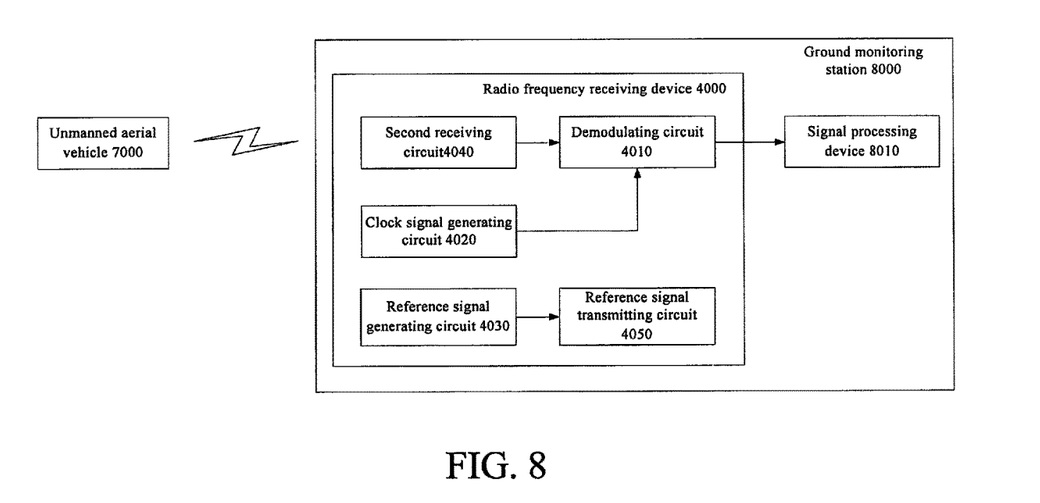
FIG. 8 is a principle block diagram of an unmanned aerial vehicle system according to an embodiment of the present invention.

FIG. 8 is a principle block diagram of an unmanned aerial vehicle system according to an embodiment of the present invention.

As shown in FIG. 8, the unmanned aerial vehicle system according to the embodiment of the present invention comprises a ground monitoring station 8000 and the unmanned aerial vehicle according to the above embodiment of the present invention, the latter being numbered with 7000.

The ground monitoring station 8000 comprises a signal processing device 8010, and the radio frequency receiving device 4000 according to any one embodiment of the present invention.

The radio frequency receiving device 4000 is adaptive to the radio frequency transmitting device 3000, to realize the data transmission between the unmanned aerial vehicle 7000 and the ground monitoring station 8000.

The radio frequency receiving device 4000 outputs the signal to be transmitted obtained by a demodulating circuit to the signal processing device 8010 for processing and storing.

The radio frequency receiving device 4000 may be disposed in a stable environment to at least cause the frequency parameter of the reference signal not to be interfered by the outside environment.

The stable environment, for example, is that the radio frequency receiving device 4000 is disposed on the fixed carrier of the ground monitoring station and the like.

The signal processing device 8010 may extract the data to be transmitted represented by the signal to be transmitted according to the signal to be transmitted for storage, to be called and used by the researchers.

According to the unmanned aerial vehicle system of the embodiment of the present invention, the radio frequency receiving device 4000 provides frequency mixing on the reference signal for the radio frequency transmitting device 3000 to obtain the carrier signal. Therefore, the radio frequency receiving device 4000 has higher momentary vibration resistance without introducing the larger frequency error into the frequency band signal under the condition of instantaneous vibration of the unmanned aerial vehicle. In this way, the signal processing device 8010 of the ground monitoring station 8000 can extract the data represented by the signal to be transmitted corresponding to the condition of the instantaneous vibration from the modulated signal for analysis and use by the researchers. Further, it is favorable for proposing optimized solutions to the instantaneous vibration of the unmanned aerial vehicle.

Further, the unmanned aerial vehicle system may further comprise an additional radio frequency receiving device disposed on the unmanned aerial vehicle and an additional radio frequency transmitting device disposed in the ground monitoring station.

The additional radio frequency receiving device is adaptive to the additional radio frequency transmitting device, to realize data transmission.

The additional radio frequency transmitting device and the additional radio frequency receiving device may have the setting structures corresponding to FIGS. 1 and 2, and may also have the setting structures corresponding to FIGS. 3 and 4.

Although specific embodiments of this invention are described above in detail through some examples, those skilled in the art shall understand that the above examples are explanatory only and are not limited to the disclosed embodiments. Many modifications and alternations can be made to be apparent without departing from the scope and spirit of various embodiments of this description. The terms used in the present invention are intended to best illustrate the principles of the embodiments, the practical applications or technical improvements for the technologies available in the market, or are intended to allow those skilled in the art to understand the embodiments disclosed in the present invention. The scope of the present invention is defined by the appended claims.

The invention claimed is:

1. A radio frequency transmitting device, comprising:
a first crystal oscillator, configured to provide a first clock signal with a frequency f+Δf, wherein Δf is a frequency error generated by instantaneous vibration;
a reference signal receiving circuit, configured to receive a reference signal with a frequency (N−1)×f provided by a radio frequency receiving device, wherein N is a positive integer larger than 1;
a frequency mixer, configured to perform frequency mixing processing on the first clock signal and the reference signal to obtain a carrier signal with a frequency N×f+Δf;
a modulating circuit, configured to load a signal to be transmitted on the carrier signal, to obtain a frequency band signal; and
a first transmitting circuit, configured to transmit the frequency band signal to the radio frequency receiving device,
wherein the radio frequency receiving device is disposed on a fixed carrier of a ground monitoring station.

2. The radio frequency transmitting device according to claim 1, wherein the reference signal receiving circuit receives the reference signal with the frequency (N−1)×f transmitted by the radio frequency receiving device by a first receiving antenna.

3. The radio frequency transmitting device according to claim 1, wherein the frequency of the first clock signal is 19.2 MHz, and the frequency of the frequency band signal is in the frequency band of 5.8 GHz, 2.4 GHz or 1.2 GHz.

4. The radio frequency transmitting device according to claim 1, wherein the radio frequency receiving device is disposed in a stable outside environment to at least protect a frequency parameter of the reference signal from being interfered by the outside environment.

5. A radio frequency receiving device, comprising:
a second receiving circuit, configured to receive a frequency band signal carrying a signal to be transmitted and transmitted by a radio frequency transmitting device;
a clock signal generating circuit, configured to provide a receiving clock signal with a frequency N×f, wherein N is a positive integer larger than 1;
a reference signal generating circuit, configured to provide a reference signal with a frequency (N−1)×f;
a reference signal transmitting circuit, configured to transmit the reference signal to the radio frequency transmitting device for the radio frequency transmitting device to generate a carrier signal with a frequency N×f according to the reference signal, to modulate the signal to be transmitted to obtain the frequency band signal; and
a demodulating circuit, configured to demodulate the frequency band signal according to the receiving clock signal, to obtain the signal to be transmitted,
wherein the radio frequency receiving device is disposed on a fixed carrier of a ground monitoring station.

6. The radio frequency receiving device according to claim 5, wherein
the clock signal generating circuit comprises:
a second crystal oscillator, configured to provide a second clock signal with a frequency f; and
a first frequency multiplication circuit, configured to perform N frequency multiplication processing on the second clock signal, to obtain the receiving clock signal with the frequency N×f.

7. The radio frequency receiving device according to claim 6, wherein
the reference signal generating circuit comprises:
the second crystal oscillator, configured to provide a second clock signal with a frequency f; and
a second frequency multiplication circuit, configured to perform (N−1) frequency multiplication processing on the second clock signal, to obtain the reference signal with the frequency (N−1)×f.

8. The radio frequency receiving device according to claim 5, wherein the reference signal transmitting circuit is configured to transmit the reference signal to the radio frequency transmitting device by a second transmitting antenna.

9. An unmanned aerial vehicle system, comprising a ground monitoring station and an unmanned aerial vehicle, wherein the unmanned aerial vehicle comprises a radio frequency transmitting device, the radio frequency transmitting device, comprising:
a first crystal oscillator, configured to provide a first clock signal with a frequency f;
a reference signal receiving circuit, configured to receive a reference signal with frequency (N−1)×f provided by a radio frequency receiving device, wherein N is a positive integer larger than 1;
a frequency mixer, configured to perform frequency mixing processing on the first clock signal and the reference signal to obtain a carrier signal with a frequency N×f;
a modulating circuit, configured to load a signal to be transmitted on the carrier signal, to obtain a frequency band signal; and
a first transmitting circuit, configured to transmit the frequency band signal to the radio frequency receiving device,
wherein the unmanned aerial vehicle further comprises a signal providing device and at least one sensor, the at least one sensor transmits detected data to the signal providing device, and the signal providing device generates a signal to be transmitted according to the data and to be output to a modulating circuit of the radio frequency transmitting device,
wherein the ground monitoring station comprises a signal processing device and a radio frequency receiving device, the radio frequency receiving device comprising:
a second receiving circuit configured to receive a frequency band signal carrying a signal to be transmitted and transmitted by a radio frequency transmitting device;
a clock signal generating circuit, configured to provide a receiving clock signal with a frequency N×f, wherein N is a positive integer larger than 1;
a reference signal generating circuit, configured to provide a reference signal with a frequency (N−1)×f,
a reference signal transmitting circuit, configured to transmit the reference signal to the radio frequency transmitting device for the radio frequency transmitting device to generate a carrier signal with a frequency N×f according to the reference signal, to modulate the signal to be transmitted to obtain the frequency band signal; and a demodulating circuit, configured to demodulate the frequency band signal according to the receiving clock signal, to obtain the signal to be transmitted, and wherein the radio frequency receiving device outputs the signal to be transmitted obtained by a demodulating circuit to the signal processing device for processing and storing.

10. The unmanned aerial vehicle system according to claim 9, wherein the at least one sensor comprises at least one of a camera device, an accelerometer, an inertia measuring unit, a GPS, a tilt angle sensor, a current sensor and a magnetic sensor.

11. The unmanned aerial vehicle system according to claim 9, wherein the radio frequency receiving device is disposed on a fixed carrier of the ground monitoring station.

12. The unmanned aerial vehicle system according to claim 9, wherein the clock signal generating circuit of the radio frequency receiving device comprises:

a second crystal oscillator, configured to provide a second clock signal with a frequency f; and a first frequency multiplication circuit, configured to perform N frequency multiplication processing on the second clock signal, to obtain the reference signal with the frequency N×f.

13. The unmanned aerial vehicle system according to claim 12, wherein the reference signal generating circuit of the radio frequency receiving device comprises:

the second crystal oscillator, configured to provide a second clock signal with a frequency f; and a second frequency multiplication circuit, configured to perform (N−1) frequency multiplication processing on the second clock signal, to obtain the reference signal with the frequency (N−1)×f.

14. The unmanned aerial vehicle system according to claim 9, wherein the reference signal transmitting circuit of the radio frequency receiving device is configured to transmit the reference signal to the radio frequency transmitting device by a second transmitting antenna.

15. The unmanned aerial vehicle system according to claim 9, wherein the reference signal receiving circuit of the radio frequency transmitting device is configured to receive the reference signal with a frequency (N−1)×f transmitted by the radio frequency receiving device by a first receiving antenna.

16. The unmanned aerial vehicle system according to claim 9, wherein the frequency of the first clock signal provided by the first crystal oscillator of the radio frequency transmitting device is 19.2 MHz, and the frequency of the frequency band signal obtained by the modulating circuit of the radio frequency transmitting device is in the frequency band of 5.8 GHz, 2.4 GHz or 1.2 GHz.

17. The unmanned aerial vehicle system according to claim 9, wherein the radio frequency receiving device is disposed in a stable outside environment to at least protect a frequency parameter of the reference signal from being interfered by the outside environment.

18. The unmanned aerial vehicle system according to claim 9, wherein the radio frequency receiving device is disposed on a fixed carrier.

* * * * *